United States Patent Office 2,812,357
Patented Nov. 5, 1957

2,812,357

REMOVAL OF HYDROPEROXIDE CARBINOLS FROM AROMATIC HYDROPEROXIDES

William Webster, Falkirk, Scotland, and Bernard Hammond Markham Thompson, Lower Kingswood, England, assignors, by mesne assignments, to Hercules Powder Company, a corporation of Delaware No Drawing. Application November 26, 1954, Serial No. 471,524

Claims priority, application Great Britain January 12, 1954

3 Claims. (Cl. 260—610)

The present invention relates to the production of α,α-dialkyl-arylmethyl hydroperoxides and in particular to the production of diisopropylbenzene dihydroperoxide in a substantially pure state.

The production of meta- and para-diisopropylbenzene dihydroperoxides by the oxidation of meta- and para-diisopropylbenzene has already been described, for instance in British Patents Nos. 641,250 and 646,102. The oxidation reaction product contains, in addition to the dihydroperoxide and the corresponding monohydroperoxide, an appreciable amount of another hydroperoxide, namely meta- or para-(2-hydroperoxy-2-propyl) phenyl-dimethyl carbinol, hereinafter referred to as carbinol hydroperoxide.

The carbinol hydroperoxide shows a strong resemblance in its physical and chemical properties to the dihydroperoxide, and for this reason it is usually separated in admixture with the latter under most conditions employed, e. g. solvent extraction, for the separation of the dihydroperoxide from the diisopropylbenzene oxidation product. In a number of cases where the further processing of the dihydroperoxide is envisaged the presence of carbinol hydroperoxide as contaminant is undesirable. For instance when the meta- or para-diisopropylbenzene dihydroperoxide is converted to resorcinol or hydroquinone, respectively, by treatment with acidic reagents, the carbinol hydroperoxide yields meta- or para-isopropenyl phenol which can interfere with the recovery of the dihydric phenol either by forming condensation products with the dihydric phenol and thereby reducing the yield of the latter, or merely by contaminating the product dihydric phenol and thereby lowering its purity. For this reason a means of separating pure dihydroperoxide from a mixture containing carbinol hydroperoxide is of considerable practical value. It is possible to obtain dihydroperoxide substantially free from carbinol hydroperoxide by fractional crystallisation, for instance from a mixture of benzene and petroleum ether of B. P. 60–80° C. By this means, however, only very low recoveries are obtainable, the bulk of the dihydroperoxide remaining in solution.

It has now been found that the dihydroperoxide can be selectively precipitated as its sodium salt from solution in an organic solvent, and that substantially pure dihydroperoxide can be readily obtained in good recovery from mixtures containing carbinol hydroperoxide, such as are produced by the oxidation of meta- and/or para-diisopropylbenzene, by this means. These mixtures usually contain up to 20% of carbinol hydroperoxide, but higher concentrations may result from the use of particular oxidation reaction conditions. An additional advantage of the invention is that dihydroperoxide can be separated from mixtures containing small amounts of mono-hydroperoxide as well as carbinol hydroperoxide. Such mixtures are frequently obtained in the usual processes for separating dihydroperoxide from diisopropylbenzene oxidation products. Furthermore the process has the advantage of producing a fraction rich in carbinol hydroperoxide at the same time.

Accordingly the present invention, for the purification of crude meta- and/or para-diisopropylbenzene dihydroperoxide admixed with carbinol hydroperoxide, comprises the process of contacting the diisopropylbenzene dihydroperoxide-containing mixture dissolved in an organic solvent with an aqueous sodium hydroxide solution so as to precipitate the dihydroperoxide in the form of a salt substantially free from carbinol hydroperoxide, the sodium hydroxide solution being present in a concentration of not less than about 3 N and in an amount such that, when the dihydroperoxide salt has been precipitated, the excess hydroxide, if any, is present in a concentration of not more than about 8 N.

The process of the present invention is advantageously used for the purification of crude dihydroperoxide prepared by the reaction of diisopropylbenzene in the liquid phase at elevated temperatures with molecular oxygen. The resulting oxidate may, if desired, be treated for the removal of the bulk of the unreacted diisopropylbenzene and of the diisopropylbenzene monohydroperoxide, for instance by extracting the oxidate with a solvent for the diisopropylbenzene dihydroperoxide such as, for instance, a non-acidic aqueous solution. Preferred solvents include 1 to 10% sodium and potassium hydroxide solutions, but other solvents, e. g., water, may be used if desired. The unreacted diisopropylbenzene and the diisopropylbenzene monohydroperoxide will remain in the non-aqueous phase while the dihydroperoxide together with the carbinol hydroperoxide pass into the aqueous phase. Crude dihydroperoxide may be obtained from the aqueous phase by neutralising the latter with, for instance, carbon dioxide and filtering off the precipitate so obtained. Alternatively the dihydroperoxide together with the carbinol hydroperoxide may be extracted, if desired after neutralisation, directly into the organic solvent in which the process of the invention is carried out.

A wide range of organic solvents, in which the crude dihydroperoxide is dissolved, or into which it is extracted, may be used in the process of the present invention. By way of example may be mentioned benzene, toluene, xylene, cumene, cymene, and like aromatic hydrocarbons; diethyl ether, diisopropyl ether and like aliphatic ethers; acetone, methyl ethyl ketone, methyl isobutyl ketone, cyclo-hexanone and like ketones; ester solvents such as ethyl acetate and amyl acetate; and halogenated hydrocarbon solvents such as chloroform, carbon tetrachloride, tetrachlorethane and the like. Aliphatic alcohols may also be used, but with the lower members the recovery of the sodium salt of the dihydroperoxide is low due to its solubility. Aliphatic hydrocarbons may also be used but suffer from the disadvantage that the free dihydroperoxide is not very soluble in such solvents. The use of benzene or methyl isobutyl ketone is preferred.

The concentration of the dihydroperoxide in the organic solvent may vary within a wide range, and suitable values lie between about 10 and 50% weight/volume. It is preferred to use concentrations of between 20 and 25% weight/volume.

The sodium hydroxide is added to the organic solvent solution of the dihydroperoxide in the form of an aqueous solution, suitably of a concentration not less than about 3 N and up to about 10 N. The sodium hydroxide solution is suitably mixed with the dihydroperoxide solution in a vessel provided with means to ensure efficient mixing and stirring of the reactants. To obtain maximum yields it is necessary to add at least the stoichoimetric quantity of hydroxide required to convert all the hydroperoxide groups of the dihydroperoxide present to the corresponding salt, but less than this amount may be used if desired. The concentration of the sodium hydroxide, when added as a solution should be not less than about 3 N as below this concentration the dihydroperoxide salt will not precipitate. Furthermore, the amount and concentration of the sodium hydroxide solution should be such that, when precipitation of the dihydroperoxide salt has occurred, the excess sodium hydroxide, if any, is present in a concentration of less than about 8 N. Above the latter concentration precipitation of the carbinol hydroperoxide may occur. It is therefore possible to add concentrations of sodium hydroxide in excess of 8 N initially, for instance up to 12 N, provided that when equilibrium has been reached, enough sodium hydroxide has been taken up in precipitating the dihydroperoxide to reduce the residual alkali concentration in the aqueous phase to less than about 8 N. It is preferred to use concentrations of sodium hydroxide which are between 4 and 6 N.

Under these conditions the dihydroperoxide is precipitated as a salt which may be filtered off while substantially all of the carbinol hydroperoxide remains in solution as the sodium salt and may be recovered, if desired, by methods known in the art.

The sodium salt of the precipitated dihydroperoxide is then washed if desired with a small amount of an organic solvent such as those mentioned above. It is preferred, however, to wash it with small amounts of sodium hydroxide solution, between about 3 and 8 N. In this way any traces of carbinol hydroperoxide which may have co-precipitated with the dihydroperoxide sodium salt are washed out. If it is desired to obtain the free dihydroperoxide, the dihydroperoxide salt may be added to water and acidified, for instance by treating with carbon dioxide. The free dihydroperoxide can then be filtered off or extracted into an organic solvent such as benzene and concentrated in vacuo to form the crystalline compound.

The following examples are given to illustrate methods by which the process of the invention may be carried out in practice. In the examples the parts by weight and parts by volume bear the same relation to each other as do kilograms to litres. Throughout the specification the expression "w./w." designates that the numerical value for the concentration of a solute in solution is expressed on the basis of the number of grams of solute which are contained in 100 grams of the solution thereof. Similarly, the expression "w./v." designates that the concentration of solute is based on the number of grams of solute which are contained in 100 cc. of solution.

*Example 1*

A sample of crude meta-diisopropylbenzene dihydroperoxide containing, as impurity, carbinol hydroperoxide was obtained from a meta-diisopropylbenzene oxidation product by extracting with 4% w./v. aqueous sodium hydroxide solution, washing the aqueous extract with one third its volume of benzene to remove a small amount of diisopropyl benzene monohydroperoxide, neutralising the alkali extract with carbon dioxide to a pH of 8–9 and extracting the precipitated dihydroperoxide into benzene. The benzene solution was washed with one tenth of its volume of water to remove inorganic salts, and then evaporated under reduced presure on the water bath at 50° C. to remove the benzene. The sample of dihydroperoxide thus obtained solidified on cooling, had M. P. 50–54° C. and contained about 10–11% by weight of carbinol hydroperoxide.

By fractional crystallisation of the product from a mixture of benzene and petroleum ether of B. P. 60–80° C., about one third of the product was obtained as crystalline solid of M. P. 60–61.7° C. (pure dihydroperoxide having a M. P. 61–62° C.). The bulk of the product, recovered by evaporating the filtrate under reduced presure, was obtained as an oil which set to a sticky gummy mass but showed no tendency to crystallise either on standing or on attempted recrystallisation from benzene/petroleum ether.

The latter fraction was then treated according to the process of the present invention being first taken up in benzene to form an approximately 25% w./v. solution and shaken with 50% aqueous sodium hydroxide solution in an amount equal to 75% of the stoichiometric quantity required to convert all hydroperoxide groups present to sodium salt. A bulky precipitate of sodium salt separated and was filtered off and washed with benzene. It was dissolved in water and acidified with carbon dioxide to liberate the free dihydroperoxide which was extracted into benzene. The benzene solution after washing with water and evaporating under reduced pressure on the water bath at 50° C., yielded a product which crystallised readily on cooling, and proved to be substantially pure dihydroperoxide of M. P. 60–62° C.

*Example 2*

A solution of crude dihydroperoxide in benzene (about 20% w./v.) of similar composition to that in Example 1 in benzene was stirred with a solution of 20% w./v. aqueous sodium hydroxide in an amount equal to 3 times the volume required to form the disodium salt of all the dihydroperoxide present. A white course granular precipitate of the dihydroperoxide salt was formed. This was filtered at the pump and dried in vacuo.

The dried sodium salt was stirred for 30 minutes with sufficient 20% w./v. aqueous sodium hydroxide to form a thin slurry. The precipitate was filtered at the pump and sucked dry. It was dissolved in water and carbonated with carbon dioxide, the neutralised solution then being extracted with benzene. The benzene solution was filtered and concentrated by distillation at 30–40° C. under reduced pressure. The concentrated benzene solution of dihydroperoxide was poured into a light petroleum-ether boiling between 40° and 60° C. to precipitate dihydroperoxide, which was filtered at the pump and freed from solvents in vacuo. The dihydroperoxide thus obtained had a melting point of 59° to 60° C., and was found on analysis to contain less than 2% carbinol hydroperoxide.

*Example 3*

A solution of 255 parts by weight of meta-diisopropylbenzene dihydroperoxide and 25.5 parts by weight of carbinol hydroperoxide in 1500 parts by volume of methyl isobutyl ketone was stirred with 500 parts by volume of 20% w./v. aqueous sodium hydroxide solution. A white granular precipitate was formed which was filtered at the pump and then stirred with a further quantity of 20% w./v. sodium hydroxide. It was again filtered off and dissolved in water. This aqueous solution was treated with carbon dioxide and worked up to recover purified dihydroperoxide as in the previous example. The dihydroperoxide produced (167 parts by weight) had M. P. 60°–61° C. and contained less than 2% carbinol hydroperoxide by analysis.

*Example 4*

A solution of crude diisopropylbenzene dihydroperoxide in methyl isobutyl ketone (250 parts by volume) containing 39.5 parts by weight dihydroperoxide, 2.5 parts by weight carbinol hydroperoxide and 0.5 part by weight monohydroperoxide was stirred for 1 hour with 68.5 parts by volume of 20.4% w./v. aqueous sodium hydroxide. A white crystalline solid separated immediately. The solid was filtered at the pump and the filtrate phases separated, their volumes measured, and analysed for hydroperoxides. It was found that 67% of the dihydroperoxide originally contained in the methyl isobutyl ketone solution had been precipitated as the disodium salt. This precipitated dihydroperoxide contained only 1.3% w./w. carbinol hydroperoxide and no monohydroperoxide.

Example 5

The previous example was repeated except that 75.3 parts by volume of 20.4% w./v. aqueous sodium hydroxide solution was used. The precipitated disodium salt of the dihydroperoxide was found to contain 72% w./w. of the dihydroperoxide initially present in the methyl isobutyl ketone solution and to be 98.7% w./w. pure.

Example 6

A solution of crude meta-diisopropylbenzene-dihydroperoxide in methyl isobutyl ketone (5,000 parts by volume) containing 571 parts by weight of dihydroperoxide, 524 parts by weight of carbinol hydroperoxide and 54 parts by weight of monohydroperoxide was stirred for 1 hour with 2,200 parts by volume of 5 N aqueous sodium hydroxide, this representing a 100% excess over the theoretical amount needed to convert all the hydroperoxide groups of the dihydroperoxide present to the sodium salt. A white crystalline solid separated immediately. This was filtered off, washed with acetone, dried in vacuo and weighed. It was found that 85% of the dihydroperoxide originally contained in the organic solvent solution had been precipitated as the disodium salt, which on acidification yielded meta-diisopropylbenzene dihydroperoxide which was 96.8% pure.

Example 7

A solution of crude p-diisopropylbenzene dihydroperoxide in methyl isobutyl ketone (3,000 parts by volume) containing 145 parts by weight of p-dihydroperoxide, 39 parts by weight of p-carbinol hydroperoxide and 4 parts by weight of p-monohydroperoxide was stirred for 1 hour with 500 parts by volume of 5 N aqueous sodium hydroxide, this representing approximately the theoretical amount needed to convert all the hydroperoxide groups of the p-dihydroperoxide present to the di-sodium salt. A white crystalline solid separated immediately. This was filtered off, washed with methyl isobutyl ketone and the latter solvent removed by vacuum treatment in a desiccator.

The di-sodium salt was suspended in water and the solution neutralised with carbon dioxide. The precipitated p-dihydroperoxide was filtered, washed with water, dried and analysed. It was found that 60% by weight of the p-dihydroperoxide initially present in the methyl isobutyl ketone solution had been recovered at a purity of 94% w./w. with respect to the carbinol hydroperoxide.

We claim:

1. The method of purification of diisopropylbenzene dihydroperoxide of the group consisting of the m- and p-isomers and mixtures thereof which comprises contacting a crude mixture consisting essentially of said dihydroperoxide, contaminated with up to 20% of α-hydroxy-α'-hydroperoxydiisopropylbenzene, in 10 to 50% weight/volume solution in a neutral organic solvent with an aqueous solution of sodium hydroxide between 4 and 6 N concentration in at least a stoichiometric amount required to convert all hydroperoxide groups of the dihydroperoxide to the corresponding salt, separating the solid salt of said diisopropylbenzene dihydroperoxide from the remaining liquids, hydrolyzing said salt in the presence of excess water and separating the diisopropylbenzene dihydroperoxide therefrom.

2. The process of claim 1 in which the dihydroperoxide is meta-diisopropylbenzene dihydroperoxide.

3. The process of claim 1 in which the dihydroperoxide is para-diisopropylbenzene dihydroperoxide.

References Cited in the file of this patent

FOREIGN PATENTS 968,209 France _____ Apr. 12, 1950
 (Corresponding Canada 485,435, Aug. 5, 1952)
498,029 Belgium _____ Sept. 30, 1950
(Corresponding Hawkins et al. 2,715,646, Aug. 16, 1955)